United States Patent
Babkov et al.

(10) Patent No.: US 10,344,680 B2
(45) Date of Patent: Jul. 9, 2019

(54) METHOD FOR REGULATING A GAS TURBINE POWER SUPPLY

(71) Applicant: OPEN JOINT STOCK COMPANY "RUSSIAN RAILWAYS", Moscow (RU)

(72) Inventors: Yuriy Valeryevich Babkov, Kolomna (RU); Yuriy Ivanovich Klimenko, Kolomna (RU); Pavel Leonidovich Chudakov, Lukhovitsy (RU); Vladimir Aleksandrovich Linkov, Kolomna (RU); Nikolai Valeryevich Grachev, Kolomna (RU); Oksana Aleksandrovna Istomina, Kolomna (RU)

(73) Assignee: OPEN JOINT STOCK COMPANY "RUSSIAN RAILWAYS", Moscow (RU)

( * ) Notice: Subject to any disclaimer, the term of this patent is extended or adjusted under 35 U.S.C. 154(b) by 210 days.

(21) Appl. No.: 15/356,418

(22) Filed: Nov. 18, 2016

(65) Prior Publication Data
US 2017/0306857 A1    Oct. 26, 2017

(51) Int. Cl.
*F02C 9/26* (2006.01)
*B61C 7/04* (2006.01)
(Continued)

(52) U.S. Cl.
CPC ............. *F02C 9/263* (2013.01); *B60L 15/20* (2013.01); *B60L 50/15* (2019.02); *B61C 7/04* (2013.01);
(Continued)

(58) Field of Classification Search
None
See application file for complete search history.

(56) References Cited

U.S. PATENT DOCUMENTS

| 4,341,071 A * | 7/1982 | Abo | F02C 9/28 60/39.281 |
| 4,694,188 A * | 9/1987 | Diegel | F01D 17/04 290/40 B |

(Continued)

FOREIGN PATENT DOCUMENTS

| RU | 2195763 | 12/2002 |
| RU | 2278464 | 6/2006 |
| RU | 2522258 C1 * | 7/2014 |

OTHER PUBLICATIONS

Rudenko Vladimir Fedorovich; Machine Translation of RU-2522258-C1; Jul. 2014; espacenet.com (Year: 2014).*

*Primary Examiner* — David P. Merlino
(74) *Attorney, Agent, or Firm* — Craft Chu PLLC; Andrew W. Chu

(57) ABSTRACT

The method effects control upon engines, in particular to regulating power of a gas-turbine-generator system used in gas-turbine locomotives, hybrid locomotives, etc. A control signal for the fuel metering unit actuator is formed by an electronic engine control system on the basis of processing of a signal from a turbine rpm sensor and a design value of the generator active electric output power. The system power can be preset. A preset power value is compared to a real power calculated value which is obtained according to measured values of current and voltage. An obtained difference is taken as the basis for forming a control signal for the fuel metering unit actuator in order to provide a certain turbine rpm and a control signal for a current regulator supplying energy to the generator excitation winding in accordance with the load curve of the gas turbine-generator system.

1 Claim, 1 Drawing Sheet

(51) Int. Cl.
- B60L 15/20 (2006.01)
- H02P 9/04 (2006.01)
- F02C 6/20 (2006.01)
- F02C 9/00 (2006.01)
- B60L 50/15 (2019.01)

(52) U.S. Cl.
CPC .................. *F02C 6/20* (2013.01); *F02C 9/00* (2013.01); *F02C 9/26* (2013.01); *H02P 9/04* (2013.01); *B60L 2200/26* (2013.01); *F05B 2270/1014* (2013.01); *F05B 2270/327* (2013.01); *F05B 2270/337* (2013.01); *F05D 2270/053* (2013.01); *F05D 2270/304* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 4,746,807 | A * | 5/1988 | Furo | H02P 9/04 290/40 C |
| 5,694,026 | A | 12/1997 | Blanchet | |
| 2004/0045275 | A1* | 3/2004 | Tanaka | F02C 9/20 60/39.281 |
| 2006/0021354 | A1* | 2/2006 | Mowill | F02C 9/18 60/776 |
| 2017/0248080 | A1* | 8/2017 | Chevalier | F02C 7/26 |

\* cited by examiner

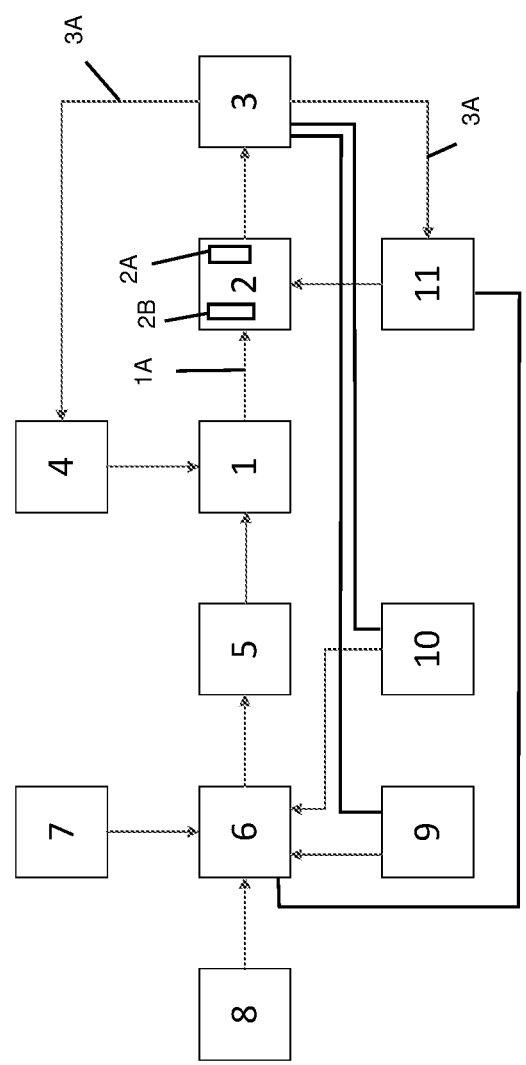

METHOD FOR REGULATING A GAS TURBINE POWER SUPPLY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of effecting control upon engines, in particular to regulating a gas turbine power supply. More particularly, the present invention relates to regulating power in gas-turbine electric locomotives, and hybrid locomotives, etc.

2. Description of Related Art Including Information Disclosed Under 37 CFR 1.97 and 37 CFR 1.98

A turbine-generator set is known in the art that comprises a gas turbine which shaft is directly connected to the rotor of an ac synchronous generator. The generator is connected in series to a static frequency converter made in the form of two thyristor bridges connected to each other via an inductance coil. The static converter is connected to an electric grid via a transformer. Regulation of this turbine-generator set is effected in practice by controlling the static frequency converter through two measuring transformers. At the time of starting the turbine, the static frequency converter supplies energy from an external grid to the generator that, in this case, is operated in the engine mode. After the turbine is started by the generator and achieves preset parameters, the static frequency converter reverses and starts converting electric energy produced by the generator for supplying it to the external grid (Patent RU 2195763, IPC H02P9/04, publ. Dec. 27, 2002).

A drawback of this control method is the impossibility of regulating turbine power rather quickly and in a broad range in cases of significant load changes, which is required in the conditions of using a gas-turbine unit on a locomotive.

A method for regulating a turbine-generator set is also known in the art, which has been taken as the prototype, according to which control action is applied to the turbine actuating member (metering unit control mechanism) and control action is also applied to the actuating member of the generator exciter, said control action on the turbine actuator being formed on the basis of at least two turbine control parameters, the control action on the exciter actuating member being also formed on the basis of two exciter control parameters, one of said turbine control parameters being a control parameter of the generator exciter, and one of said control parameters of the generator exciter being a control parameter of the turbine actuator. A deviation in the generator power, a deviation in the generator voltage or a value of the turbine shaft speed are used as such regulating parameters. The regulated system is a turbine which shaft is directly connected to a generator. In order to regulate a working fluid flow entering a turbine, an actuating member is used that may have the form of a metering unit. The generator rotor has an excitation winding receiving energy from the exciter actuating member made as a thyristor unit. The metering unit position and the thyristor unit are regulated by a regulating apparatus comprising two delay units, the output of one delay unit being connected to the actuating member for metering unit position control and the output of the other delay unit being connected to the thyristor unit for generator control. The input of each delay unit is connected with the output of its own logic unit, and the inputs of each logic unit are connected to the outputs of the units forming transfer functions of signals coming to the input of each of the units comparing control actions by controlled parameters and real values of such parameters forming during operation of the turbine-generator system. As has been already said, generator power, generator voltage, generator speed, turbine shaft rpm may be used as the control parameters for regulating the system (Patent RU 2278464, IPC H02P9/04, publ. Jun. 20, 2006).

A drawback of this control method is the impossibility of regulating turbine power rather quickly and in a broad range in cases of significant load changes, which is required in the conditions of using a gas-turbine unit on a locomotive. A narrow range of turbine rpm close to rated values is realized, which has a negative effect on its operation efficiency and reduces the service life of the unit bearing assemblies.

BRIEF SUMMARY OF THE INVENTION

The technical effect of the proposed invention is provision of rather quick regulation of electric power of the gas turbine power supply in a locomotive, according to the locomotive operating modes and a load curve of this system in a wide range of turbine rpm as well as use of the gas turbine power supply as the general power supply of a locomotive with an electric traction drive, which will result in raising reliability and efficiency of the locomotive operation.

This technical effect is achieved due to that, according to the proposed method of regulating a gas turbine power supply, a control signal for the fuel metering unit actuator is formed by an electronic engine control system (EECS) on the basis of processing of a signal from a turbine rpm sensor and a design value of the generator active electric output power, and, according to a locomotive operating mode, the system power is preset by the operator's controller, a preset power value is compared to a real power calculated value which is obtained according to measured values of current, as rectified by a traction rectifier, and voltage, an obtained difference is taken as the basis for forming a control signal for the fuel metering unit actuator in order to provide a certain turbine rpm and a control signal for a current regulator supplying energy to the generator excitation winding in accordance with the load curve of the gas turbine power supply.

BRIEF DESCRIPTION OF THE SEVERAL VIEWS OF THE DRAWINGS

The FIGURE is an accompanying drawing showing a structural block diagram of the proposed method for regulating power of the gas turbine power supply in a locomotive.

DETAILED DESCRIPTION OF THE INVENTION

The gas turbine 1 is connected, via the shaft, to the generator 2 which power outputs are connected to the input lines of the traction rectifier in the locomotive power circuit 3 supplying energy from the battery to the starter 4. The fuel metering unit 5, which is controlled by an electric signal sent by the electronic engine control system 6 (EECS) which inputs receive signals from the power controller 7, the turbine rpm sensor 8, the current sensor 9, and the voltage sensor 10, ensures a required rpm of the gas turbine 1. The current regulator 11 receives energy from the traction rectifier of the power circuit 3 and regulates current in the excitation winding of the generator 2.

The method for regulating power of the gas turbine power supply can be implemented as follows.

In order to start the turbine 1 connected to the generator 2 via the shaft 1A, the starter 4 is used that receives starting electric energy from a battery included into the locomotive power circuit 3A (as such, an asynchronous electric motor receiving energy from a frequency converter may be used). After the turbine 1 is started, the EECS 6 forms an instruction concerning rpm of the gas turbine 1 according to a value of a control signal sent by the power controller 7, which value is compared with a real value received by the EECS 6 from the turbine rpm sensor 8 measuring rpm of the turbine 1. A control instruction for the actuator of the fuel metering unit 5 is formed on the basis of a result of this comparison. At the same time, an initial signal is formed for the current regulator 11 regulating current in the excitation winding 2A of the generator 2. Real values of rectified current and voltage are measured by the current sensor 9 and the voltage sensor 10 which are arranged on the output lines of the traction rectifier 3 included into the locomotive power circuit 3A. By using a result of measuring these parameters a real value of electric power is calculated that is compared with a preset value corresponding to a signal received from the power controller 7. According to a comparison result, a control signal is formed for the current regulator 11 providing energy to the excitation winding of the generator 2. In this way output power of the gas turbine power supply is maintained at a level corresponding to its load curve in the conditions of using in a given locomotive.

While effecting control upon the gas turbine power supply, instrumentation means (not shown in the drawing) monitor rpm of the turbine 1, temperatures of the windings of the generator 2 (including temperature sensors 2B), its bearing assemblies, gases downstream the turbine 1. If critical values of the checked parameters are exceeded, the EECS 6 performs protection algorithms correcting control signals for the actuators in the power circuit 3, and, when necessary, an emergency algorithm is performed for stopping the turbine 1, including a signal for closing a shutoff valve (not shown in the drawing).

The proposed method for regulating power has been tested on a GT1h-002 gas-turbine locomotive and showed good results.

We claim:

1. A method for regulating power, the method comprising the steps of:

assembling a gas turbine power supply in a locomotive, wherein said gas turbine power supply comprises:
- a generator being comprised of an excitation winding and temperature sensors;
- a gas turbine connected via a shaft to said generator;
- a traction rectifier connected to said generator;
- a starter connected to said generator and said traction rectifier;
- a fuel metering unit connected to said gas turbine;
- an electronic engine control system connected to said fuel metering unit and having a preset critical value of temperature and a preset critical value of rpm;
- a power controller connected to said electronic engine control system;
- a turbine rpm sensor connected to said electronic engine control system;
- a current sensor connected to said electronic engine control system and said traction rectifier;
- a voltage sensor connected to said electronic engine control system and said traction rectifier; and
- a current regulator connected to said generator, said engine control system, and said traction rectifier, wherein said generator, said traction rectifier, said starter, and said current regulator form a locomotive power circuit;

starting said gas turbine with said starter and power from said locomotive power circuit;

setting an output power and an output rpm based on a locomotive operating mode with said power controller;

sending a control signal from said power controller to said electronic engine control system, said control signal corresponding to said output rpm and said output power;

detecting an actual rpm with said turbine rpm sensor for said electronic engine control system;

comparing said actual rpm and said output rpm with said electronic engine control system so as to form an adjustment rpm control instruction corresponding to adjustments to said actual rpm to match said output rpm;

sending said adjustment rpm control instruction to said fuel metering unit so as to match said actual rpm to said output rpm detecting an actual output power with said current sensor and said voltage sensor through said traction rectifier for said electronic engine control system;

comparing said actual output power and said output power with said electronic engine control system so as to form an adjustment power control instruction corresponding to adjustments to said actual output power to match said output power;

sending said adjustment power control instruction to said generator with said electronic engine control system through said current regulator;

adjusting current in said excitation winding of said generator so as to match said actual output power to said output power;

changing said locomotive operating mode with said power controller to a subsequent locomotive operating mode with a subsequent output power and a subsequent output rpm;

repeating the steps of setting said output power and said output rpm, sending said control signal, detecting said actual rpm, comparing said actual rpm and said output rpm, sending said adjustment rpm control instruction, detecting said actual output power, comparing said actual output power and said output power, and sending said adjustment power control instruction for said subsequent control signal as said control signal;

monitoring temperatures of said generator with said temperature sensors;

monitoring rpms of said gas turbine with said turbine rpm sensor;

sending said temperatures and said rpms to said electronic engine control system;

comparing said temperatures to said preset critical value of temperature with said electronic engine control system;

comparing said rpms to said preset critical value of rpm with said electronic engine control system;

sending a temperature emergency correction control signal to said gas turbine when a temperature exceeds said preset critical value of temperature; and sending an rpm emergency correction control signal to said gas turbine when an rpm exceeds said preset critical value of rpms, wherein at least one temperature emergency correction control signal corresponds to stopping said gas turbine, and wherein at least one rpm emergency correction control signal corresponds to stopping said gas turbine.

* * * * *